UNITED STATES PATENT OFFICE.

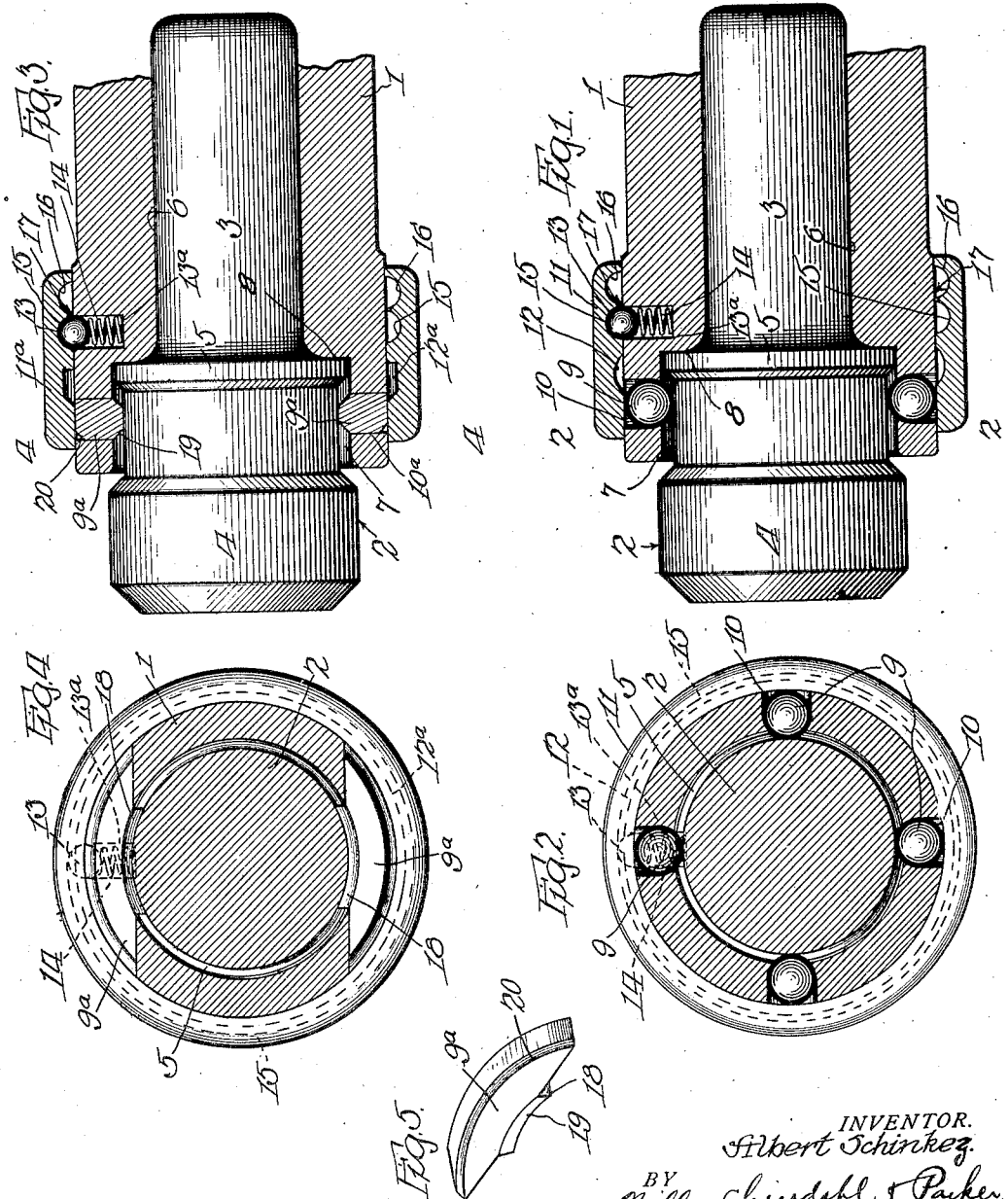

ALBERT SCHINKEZ, OF GRAND HAVEN, MICHIGAN, ASSIGNOR TO KELLER PNEUMATIC TOOL COMPANY, OF GRAND HAVEN, MICHIGAN, A CORPORATION OF MICHIGAN.

PERCUSSION-TOOL.

1,346,341.            Specification of Letters Patent.      Patented July 13, 1920.

Application filed May 29, 1918. Serial No. 237,206.

*To all whom it may concern:*

Be it known that I, ALBERT SCHINKEZ, a subject of the Emperor of Austria, residing at Grand Haven, in the county of Ottawa and State of Michigan, have invented certain new and useful Improvements in Percussion-Tools, of which the following is a specification.

The invention relates to percussion tools, and more particularly to rivet set retainers therefor; and the object of the invention is to provide a rivet set retainer of improved construction and arrangement which will effectively hold the rivet set in operative position, and at the same time is readily operable to release the rivet set.

The object of the invention thus generally stated, together with other and ancillary advantages, may be attained by the construction and arrangement illustrated in the accompanying drawings forming part hereof, in which Figure 1 is a central longitudinal sectional view through the forward end of a pneumatic hammer, illustrating one embodiment of my invention. Fig. 2 is a transverse sectional view taken on line 2—2 of Fig. 1. Fig. 3 is a view similar to Fig. 1, but showing another embodiment of the invention. Fig. 4 is a transverse sectional view taken on line 4—4 of Fig. 2. Fig. 5 is a perspective view of one of the holding members for the rivet set shown in Figs. 3 and 4.

In the drawings, 1 indicates the body of a pneumatic hammer having a rivet set 2 in its forward end. The hammer body may be of any preferred construction and the rivet set comprises a shank 3, a head 4 and an intermediate peripheral flange or shoulder 5, the hammer body being provided with a bore 6 for the shank 3 and an enlarged cavity 7 for the head 4. The inward movement of the rivet set in the body is thus limited by the shoulder 5 engaging with an annular shoulder 8 formed by enlarging the bore 6 to form the cavity 7.

The retainer is adapted to limit the outward movement of the rivet set in the body and in the embodiment shown in Figs. 1 and 2 comprises a series of members such as balls 9 entered in equidistantly spaced radial apertures 10 in the forward end of the body, and an annular member or retaining ring 11 for the balls, fitting neatly upon the periphery of the body. The balls are of a diameter slightly greater than the thickness of the walls of the body forming the cavity 7 and the inner ends of the apertures 10 are preferably shaped to form sockets for the balls but permitting a portion thereof to protrude inwardly into the path of movement of the shoulder 5 of the rivet set. Thus, when said balls are held with the outermost surfaces flush with the periphery of the body, the forward side of the shoulder 5 will engage with the inwardly protruding portion of the balls to limit the outward movement of the rivet set.

The ring 11 normally serves to hold the balls 9 in their innermost position, but means are provided for permitting them to be moved outwardly so as to allow the rivet set to be removed. To this end, the inner surface of the ring 11 is provided with a recess or an annular groove 12 adapted when moved into register with the apertures 10 to receive the balls 9 forced radially outwardly by the outward movement of the rivet set.

The means for normally holding the groove 12 out of register with the apertures 10 may comprise a member such as a ball 13 entered in a radial socket 13ª in the body and normally forced outwardly by a compression spring 14 into engagement with either of two recesses or annular grooves 15 and 16 formed in the inner surface of the ring 11. The groove 15 is positioned slightly rearwardly of the groove 12 and when the ball 13 engages therewith, said groove 12 is out of register with the radial apertures 10. The groove 16 is located rearwardly of the groove 15 a sufficient distance so that when the ring 11 is moved forwardly on the body until the ball 13 engages with the groove 15, the groove 12 is in register with the radial apertures 10. Thus, in this position of the groove, the balls 9 may be forced outwardly by the shoulder 5 in the outward movement of the rivet set sufficiently to permit the shoulder 5 to pass and the rivet set to be removed. The grooves 12, 15 and 16 are so arranged with reference to the balls 9 and 13 that the grooves 15 and 16 may be located one immediately rearwardly of the other and preferably the ridge between the grooves is machined slightly to reduce the height thereof, as at 17 (Fig. 1). Thus it will be seen that the force required to cause the ball 13 to move from one groove to the other is not so great.

In the embodiment illustrated in Figs. 3 to 5, the means for normally holding the ring 11a in the desired position upon the body is the same as that shown in Figs. 1 and 2. In this instance, however, the means for engaging with the rivet set to prevent its withdrawal comprises one or more members 9a entered in slots 10a in the body. Said members are normally held in operative position by the ring 11a which has a groove 12a therein arranged to receive the members 9a, to permit the withdrawal of the rivet set.

The members 9a are made substantially arcuate in form with their outer edges conforming to the periphery of the body, and preferably the inner edges of said members are formed straight, except that central portions or projections 18 are provided which are arranged to protrude through the slots 10a. The inner edges of said projections may be curved to conform to the periphery of the rivet set and the opposite inner side edges thereof are beveled as at 19 so that when engaged by the shoulder 5 the members may be readily forced outwardly with a cam action into the groove 12a. Similarly the outer forward edges of the members 9a are beveled as at 20 to facilitate the operation of forcing the members into operative position.

It will be apparent that the construction of the retainer as well as the operation of releasing the rivet set from the body is very simple.

I claim as my invention:

In a percussion tool, the combination with a barrel and a tool reciprocable therein, of a ring constructed to fit neatly upon the barrel and having in its inner surface a plurality of depressions disposed in longitudinal relation, the barrel having an aperture and a socket in its wall also disposed in longitudinal relation, two holding members entered in the aperture and socket for holding respectively the ring and, in the normal position of the ring, the tool in operative relation to the barrel, the ring holding member being adapted to engage in certain of the depressions in the ring, and the tool holding member being adapted to engage in certain other of said depressions when the ring is in abnormal position upon the barrel whereby to release the tool holding member, and a spring in said socket permitting the ring holding member to yield whereby to allow movement of the ring longitudinally of the barrel.

In testimony whereof I have hereunto set my hand.

ALBERT SCHINKEZ.